Figure 1:
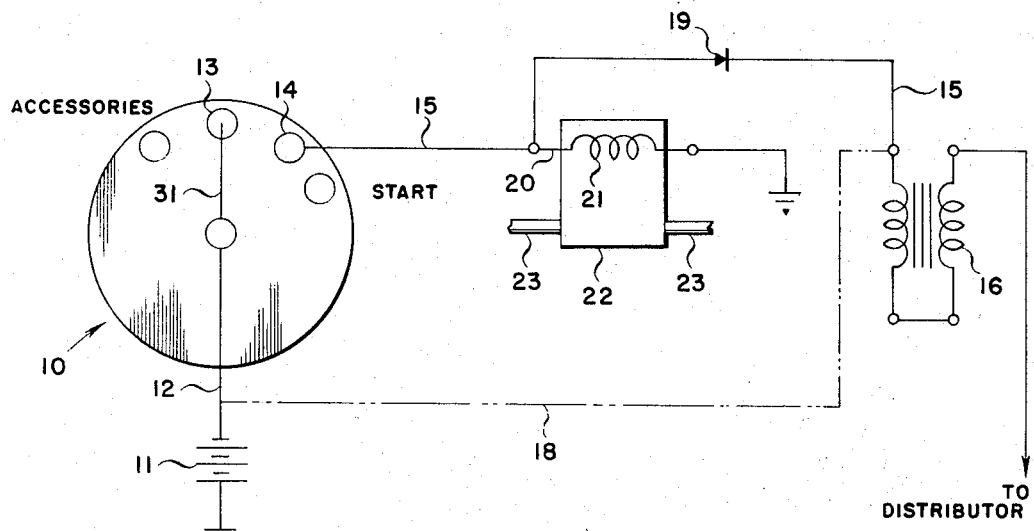

Nov. 28, 1967  N. H. NIELSEN  3,354,980

THEFT PREVENTION DEVICE FOR MOTOR VEHICLES

Filed Feb. 16, 1966

INVENTOR.
NIELS H. NIELSEN
BY
*George C. Sullivan*
Agent

United States Patent Office 3,354,980
Patented Nov. 28, 1967

3,354,980
THEFT PREVENTION DEVICE FOR MOTOR VEHICLES
Niels H. Nielsen, Austell, Ga., assignor to Lockheed Aircraft Corporation, Burbank, Calif.
Filed Feb. 16, 1966, Ser. No. 527,925
3 Claims. (Cl. 180—114)

This invention relates to theft prevention devices for motor vehicles and more particularly to such a device that is readily connectable into the electrical system of a motor driven vehicle and when so connected is automatically operative to prevent the flow of fuel to the vehicle's motor and necessary for its operation without first energizing the ignition circuit of the vehicle's electrical system.

Statistics, largely those compiled by insurance companies, show that the theft or other unauthorized use of automotive vehicles are often accomplished through the use of a conductor or what is more commonly called a "jumper" connected between the ignition coil and the battery. Such statistics further show that in the majority of cases these jumpers are connected directly between the battery and ignition coil from under the hood of the vehicle whereby the entire ignition circuit including the switch within the passenger compartment or cab of the vehicle is shunted.

Many proposals have heretofore been made which are or could be effective in overcoming the above thefts, but none of these have been favorably received and employed. It is felt that the reason for this is that all these prior devices or mechanisms are either too complex or require special attention or action of the owner or legitimate user of the vehicle.

In a recently proposed type of theft prevention device a valve is incorporated in the fuel or gas line with an actuating control therefor responsive to operation of the generator unless such actuating control is disconnected from the generator by the normal operation of the ignition key. Thus, the valve blocks the fuel line when the generator operates to prevent fuel flow to the engine unless this valve has been rendered inoperative by movement of the ignition switch by its key.

This prior device is objectionable in that it relies on several operating units in addition to the generator circuitry, the malfunction of any one of which will render the device inoperative. Its installation is also unduly complicated requiring a substantial addition to the already complex ignition circuitry found in modern motor vehicles. Moreover, its incorporation in a vehicle is relatively apparent even to an amateur thief, its necessary connection to the generator and voltage regulator being readily accessible for inspection and disconnection.

The present invention is therefore directed to improvements in such theft prevention devices by the provision of a completely reliable and foolproof device requiring a minimum addition to the existing electrical system and which may be incorporated therein in a number of totally unobvious locations so as to be virtually undetectable. Its installation is simple and inexpensive and once installed its operation is totally automatic, being an integral part of the vehicle's electrical system and requiring the energization of the ignition circuit prior to the operation of the vehicle's motor as designed and intended.

This device is similar to the prior devices referred to above in that it contemplates valve means within the fuel line to control fuel flow therethrough but otherwise there is no similarity whatever. In contrast, the device herein proposed includes a one-way current control valve between the ignition switch and the ignition coil and a fluid check valve in the fuel line with actuating means therefor responsive to current from the battery when the switch is closed, i.e., the ignition is "turned on." Thus, unless and until the ignition system is energized, the check valve blocks the fuel line preventing fuel flow therethrough to the carburetor.

Figure 2:
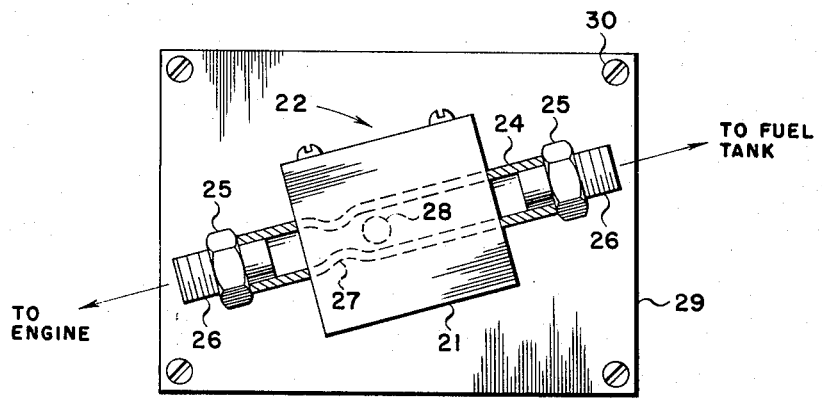

With the above and other objects in view as will be apparent, this invention consists in the construction, combination, and arrangement of parts all as hereinafter more fully described, claimed and illustrated in the accompanying drawings wherein:

FIGURE 1 is an electrical diagram of part of a conventional electrical system employed in automotive vehicles as modified to incorporate a theft prevention device in accordance with the teachings hereof, a jumper as usually employed to shunt the circuit between the battery and the ignition coil being shown in phantom lines; and FIGURE 2 is a view in elevation of the check valve in the fuel line and the actuating means therefor shown schematically in FIGURE 1.

Referring more particularly to the drawings 10 designates a standard ignition switch commonly employed in automotive vehicles to connect the battery 11 to a selected circuit in the operation of the vehicle. The battery 11 is connected to the switch 10 at all times through a conductor 12 and selectively through the switch 10 to the several electrical circuits for total operation of the vehicle. Thus, the switch 10 includes an "off" position 13 operatively disconnecting the battery 11 from all circuits, an "on" contact 14 connected by a conductor 15 to the ignition coil 16 and distributor for operation of the engine, a "start" contact connected to the self-starting mechanism of the engine, and an "accessories" contact connected to the several electrical circuits incidental to operation of the vehicle.

The switch 10 is normally locked in the "off" position 13 from which it is released by a conventional ignition key for selective operation in the above manner. When no key is available, the circuit from the battery 11 through conductor 12, the switch 10 and conductor 15 to the coil 16 can normally be bypassed or shunted by a conductor or jumper 18.

In order to avoid this, the present invention proposes to interrupt the conductor or lead 15 at some convenient location in its length and operatively connect therein a one-way flow valve such as for example a silicon rectifier type of diode 19. These diodes are small and are not appreciably greater in transverse dimension than the conductor 15, reliable in operation, and of rugged construction. Between the switch 10 and the diode 19 the conductor 15 is electrically connected to one end of a spur conductor 20 the other end of which is connected to a solenoid coil 21 associated with a shutoff valve 22 mounted in the fuel line 23 at any convenient and inconspicuous location in its length between the fuel tank and the carburetor of the vehicle.

The shutoff valve 22 consists of a conduit 24 substantially equal in transverse dimension to the fuel line 23 and terminating at opposite ends in fittings 25 including appropriate means such as threads or the like 26 for removable connection to coacting means provided on the fuel line 23. Thus, the fuel line 23 is broken in its length and its adjacent ends formed or otherwise provided with couplings to connect the fittings 25 whereby the conduit 24 constitutes a removable section in the length of the fuel line 23.

Medially of its length the internal diameter of the conduit 24 is reduced, as at 27, and a ball 28 having a diameter substantially less than that of the conduit 24 but greater than the reduction 27 is located in the conduit 24. This ball 28 is fabricated of material impervious to the fuel which the line 23 is to convey being preferably brass-plated iron and is freely movable in the conduit 24 between one end thereof and the reduction 27. The wall of the conduit 24 defining the reduction 27 is arcuate conforming to that of the periphery of the ball 28 to thereby act as a seat therefor when the ball 28 abuts it to totally block the flow of fuel therethrough.

The solenoid coil 21 is mounted in fixed position on the conduit 24 in any conventional manner so as to be disposed adjacent and around the reduction 27. The conduit 24 thus connected to the coil 21 may be mounted on a bracket or plate 29 through an appropriate connection of the coil housing to the plate 29 to facilitate the mounting of the assembly to stationary structure such as the chassis of the vehicle. For this purpose removable connectors or bolts 30 are provided with the plate 29 and the vehicle or chassis is equipped with suitable means to receive and coact with such bolts 30.

Whether or not the mounting bracket 29 is employed, the conduit 24 when installed in operative position is disposed at an angle preferably about 15 degrees relative to the horizontal with that portion thereof in which the ball 28 is located raised so that normally the ball will seat against the reduction 27 under the force of gravity. Thus, in its normal position the valve 22 blocks fuel flow in the line 23 from the tank to the carburetor. Upon energizing the solenoid coil 21 however by connection of the "on" contact 14 to the battery lead 12 through movement of the contact arm 31 of the switch 10 by operation of the ignition key, the ball 28 is raised in the conduit 24 against the force of gravity. The valve 22 is thereby opened and a free flow of fuel occurs in the line 23.

In view of the foregoing, connection of the circuit from the battery 11 to the conductor 15 through the switch 10 for actuation of the valve 22 by the coil 21 is a prerequisite to the operation of the engine of the vehicle. Unless and until the valve 22 is opened as described, fuel from the tank will not be delivered to the engine and the operation thereof will cease upon exhaustion of the fuel within the carburetor. If and when a jumper 18 is connected across the battery 11 and ignition coil 16, current through the conductor 15 to the solenoid coil 21 is blocked by the diode 19 and the valve 22 remains closed.

It should be understood, of course, that the particular embodiment of the invention hereinabove shown and described is illustrative only to facilitate a clear understanding of the invention. Various changes and modifications will suggest themselves to those skilled in the art without departing from the true spirit and scope of the invention which is intended to be covered by the appended claims.

What is claimed is:

1. A theft prevention device for a vehicle having an engine, a fuel line for the delivery of fuel to said engine and an electrical circuit including a power source therefor to fire said fuel in said engine comprising a normally closed shutoff valve connectable in said fuel line, a one-way flow valve connectable in said circuit to limit the direction of current from said source to said engine, and an actuator for said shutoff valve connectable in said circuit on the remote side of said one-way valve relative to said engine responsive to current in said circuit for movement thereof out of its normally closed position for the flow of fuel to the engine.

2. The device of claim 1 wherein said one-way valve is a silicon rectifier type of diode.

3. The device of claim 1 wherein said shutoff valve includes disconnection means for its removal and replacement in said fuel line.

References Cited

UNITED STATES PATENTS

| | | | |
|---|---|---|---|
| 2,695,685 | 11/1954 | Jamison | 340—63 |
| 2,891,628 | 6/1959 | Embry | 180—114 |
| 2,956,263 | 10/1960 | Brown et al. | 340—63 |
| 3,047,728 | 7/1962 | Martin | 307—10 |
| 3,174,502 | 3/1965 | Howarth et al. | 307—10 X |

KENNETH H. BETTS, *Primary Examiner.*